May 30, 1967   P. M. CHRISTENSEN   3,322,878
SYSTEM OF THREE-PHASE SUPPLY BUS TO SINGLE-PHASE
BRANCH BUS CROSS CONNECTIONS
Filed Dec. 24, 1964   2 Sheets-Sheet 1
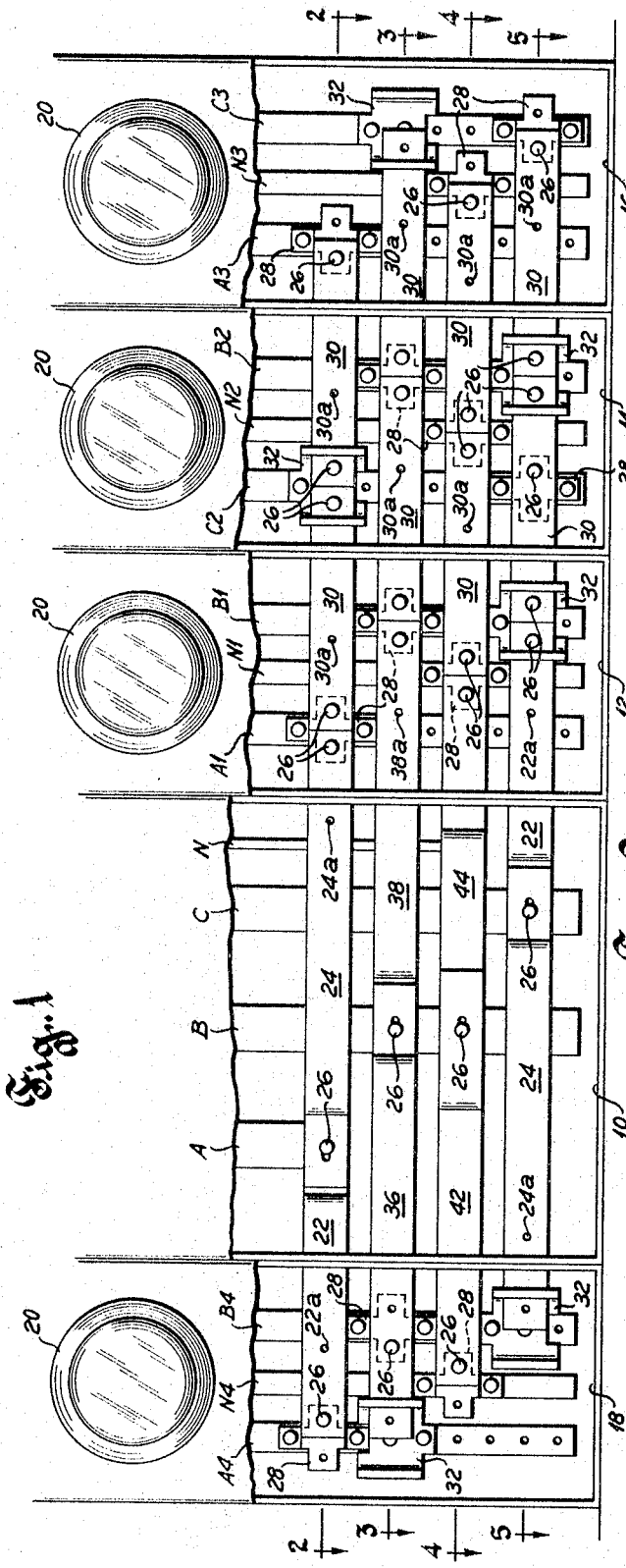
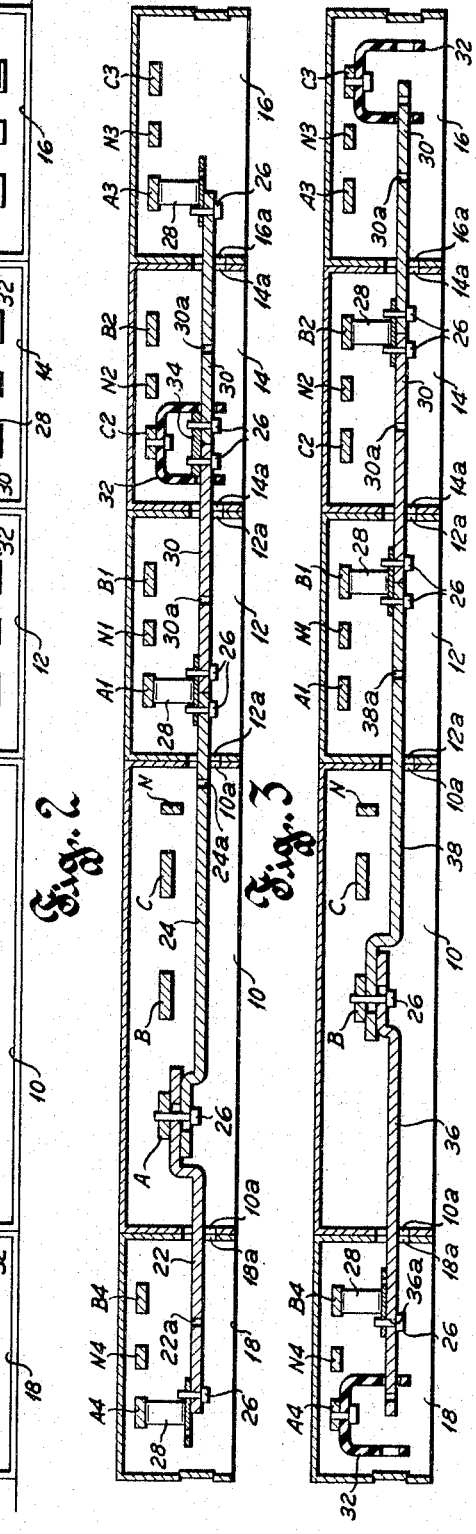

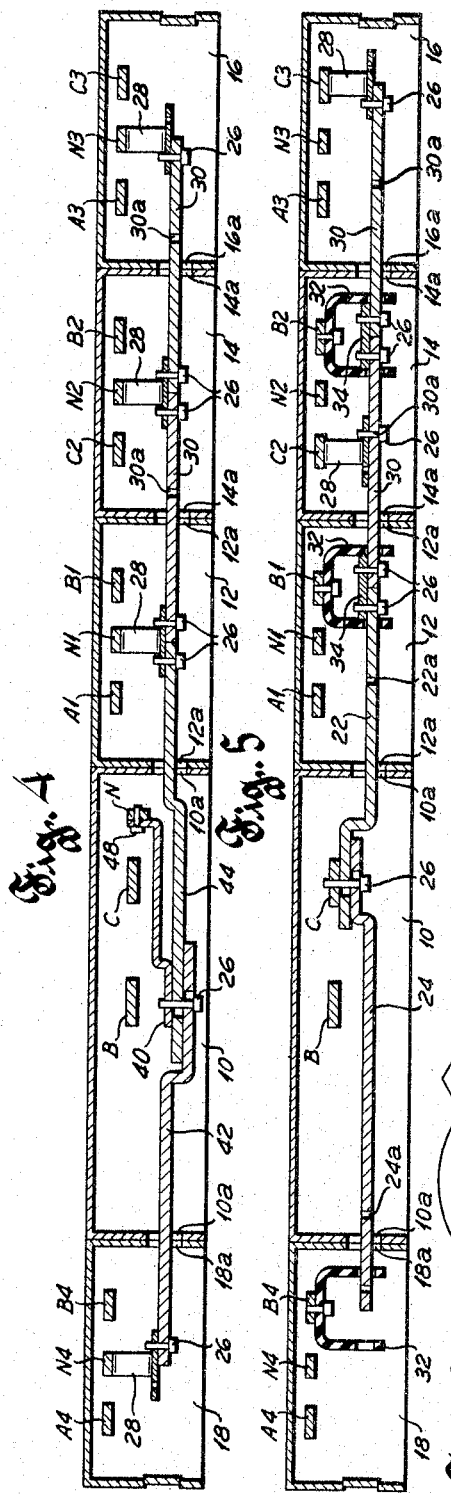
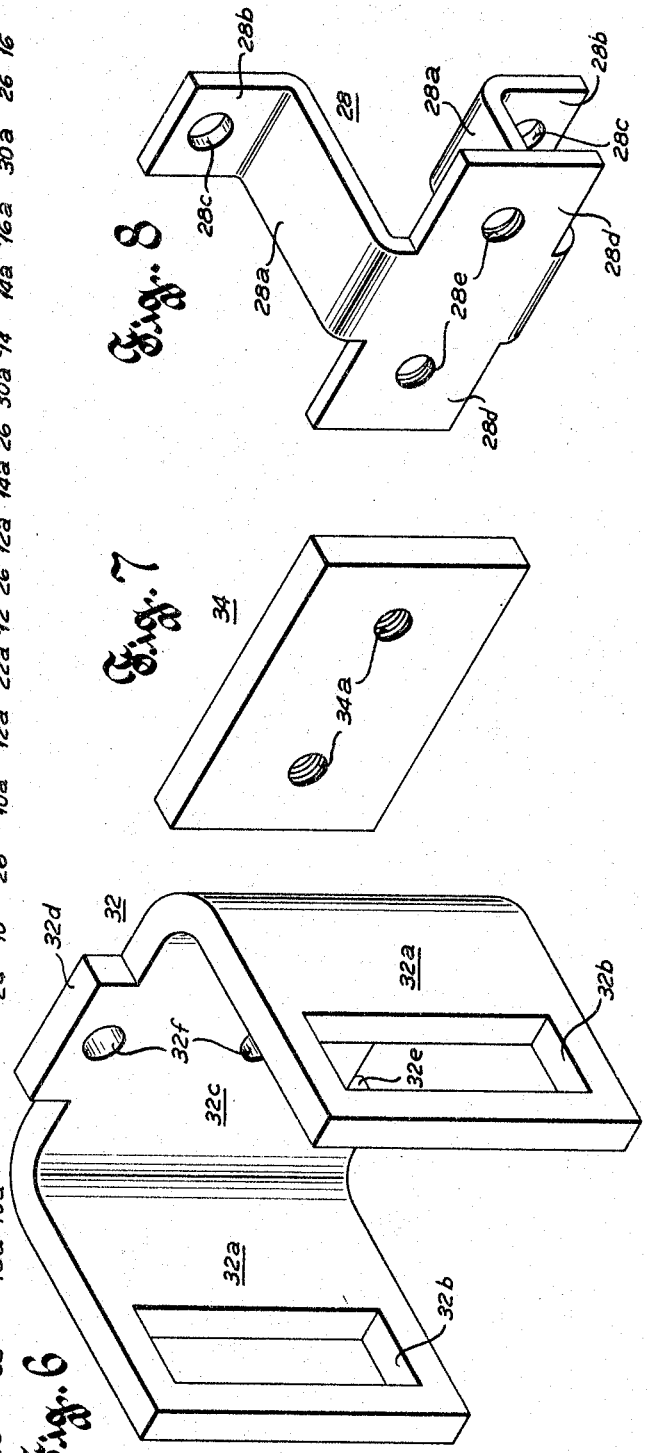

United States Patent Office 3,322,878
Patented May 30, 1967

3,322,878
SYSTEM OF THREE-PHASE SUPPLY BUS TO SINGLE-PHASE BRANCH BUS CROSS CONNECTIONS
Paul M. Christensen, Milwaukee, Wis., assignor to Cutler-Hammer, Inc., Milwaukee, Wis., a corporation of Delaware
Filed Dec. 24, 1964, Ser. No. 420,991
6 Claims. (Cl. 174—72)

This invention relates to an improved system for effecting cross connections between three-phase A.C. supply buses and a plurality of single-phase distribution buses.

While not limited thereto, the system of the present invention has particular application to the connecting of the single-phase buses of meter troughs to the three-phase supply lines at a central service entrance location.

In multiple occupancy buildings all of the watt-hour meters for the individual occupancy units or sections are often mounted close together at a central service entrance point for the electrical power. The three-phase buses are mounted in, and insulated from a sheet metal enclosure and a number of multiple sheet metal meter troughs are mounted side-by-side therewith. Each meter trough carries a single phase system of branch buses to which the meters are mounted in individual openings. Because of the desirability of balancing the load on the three-phase supply system, the buses in the meter troughs are often given different phases, e.g. A–B, C–B and A–C in a certain sequence depending upon the number of meter troughs used. Cross electrical connections from the main three-phase supply buses and the single-phase meter trough buses have heretofore taken a number of different forms, most of which require a relatively large number of different sizes and kinds of parts, because of the staggering or sequencing of single-phase voltages between the buses of the meter troughs.

It is a primary object of the present invention to provide cross connectors between three-phase supply buses and nearby single phase branch buses which entails use of but a few kinds of standardized parts.

Another objects is provide cross connectors of the aforementioned type which permits any desired voltage phase for the branch supply buses, but which facilitates arranging a sequence of phases for adjacent branch single phase buses.

A still further object is to provide cross connectors which can be readily accommodated to branch single-phase buses mounted in housings of two different standard widths without need for different sizes for any but one part which is relatively simple to make.

Other objects and advantages of the invention will hereinafter appear.

In the drawings:

FIGURE 1 is a fragmentary front elevational view, with portions broken away, of a main supply bus system and meter troughs associated therewith;

FIG. 2 is a cross sectional view taken along the line 2—2 of FIG. 1;

FIG. 3 is another cross sectional view taken along line 3—3 of FIG. 1;

FIG. 4 is a cross sectional view taken along the line 4—4 of FIG. 4;

FIG. 5 is a cross sectional view taken along the line 5—5 of FIG. 1;

FIG. 6 is an isometric view of an insulated bus bar support used in the apparatus of FIGS. 1 to 5;

FIG. 7 is an isometric view of a bus bar cross connected splice-connector used in the systems of FIGS. 1 and 5; and FIG. 8 is an isometric view of an electrical conducting connector for supporting and connecting bus bars cross connectors to meter trougher bus bars of the system of FIGS. 1 to 5.

Referring to FIG. 1, it shows a watt-hour meter system for central location in a multiple dwelling unit or office building. The system comprises an enclosed main supply bus housing 10, and enclosed meter troughs 12, 14, 16 and 18, each of which may be assumed to have a multiplicity of meters 20 mounted therein. The housing and troughs are generally rectangular elongated enclosed boxes of standardized dimensions and formed of sheet metal. The front panels of the housing and trough are shown broken away near their lower ends to facilitate illustration of the main feature of the invention.

Mounted in housing 10 are voltage bus bars A, B and C and a neutral bus bar N of a three-phase A.C. supply which may be assumed to have connection to an external supply source. In troughs 12, 14, 16 and 18 are mounted the single phase branch buses A1 and B1, C2 and B2, A3 and C3, and A4 and B4, respectively, and the neutral bus bars N1, N2, N3 and N4, respectively. All of the aforementioned bus bars may be assumed to be supported on, but insulated from the inside rear panels of the housing and troughs by conventional insulating supports, not shown. It will be seen that the bus bars in the meter troughs are set in a plane closer to the inside rear panels than are the main supply bus bars in housing 10 for a reason that will hereinafter be apparent.

Near their lower ends the side walls of housing 10 and the meter troughs are provided with knockouts which may be easily removed to provide clearance openings 10a, 12a, 14a, 16a and 18a, to accommodate cross connector bars which will now be described. As shown in FIGS. 1 and 2, bus bar A has connected thereto Z-offset cross connector bars 22 and 24 by bolt 26 which passes through elongated openings in each of the connectors to take down into a threaded opening in bar A. Bar 22, at its other end, is secured by a bolt 26 to the bight of a U-shaped stand-off connector 28 which is secured to bar A4 in trough 18. Bar 24, at its other end, is similarly secured to a second stand-off connector 28 secured at bar A1 in trough 12.

The stand-off connectors 28, as best shown in FIG. 8, have a pair of legs 28a which are outwardly turned in a common plane adjacent their ends to provide bus bar mounting tap portions 28b having bolt accommodating openings 28c. The bight of the connectors 28 have integral laterally extending wings 28d in which are formed threaded openings 28e. As seen in FIG. 1, threaded openings are formed in the bus bars of the meter troughs at regular spaced intervals, preferably on centers of one-half the distance between the centers of openings 28c of connectors 28. Thus connectors 28 can be easily secured to these buses in positions maintaining a right angle relationship between the bus bars and cross connector bar. The cross connector bars are of a length selected to terminate at the middle of the bight of connectors 28.

A straight cross connector bar 30 is connected by a bolt 26 to the last mentioned stand-off connector 28 adjacent its left-hand end, and adjacent its right-hand end projects through an opening in a leg of a U-shaped stand-off insulating support 32 which is secured to bus bar C2 in trough 14. As best seen in FIG. 6, the support 32 comprises legs 32a in which are formed rectangular openings 32b to accommodate cross connector bars. The bight portion 32c of the supports 32 has an integral extension 32d at one side, and at its other side is provided with a rectangular notch 32e. The extension 32d and main portion of bight 32c are provided with two bolt receiving openings 32f which have a center-to-center distance corresponding to the center-to-center distances between any two of the threaded openings in the lower portion of the meter trough bus bars.

Connector bar 30 is connected midway between the legs of support 32 to a second like connector bar 30 by a lap splice bar 34 which is shown in detail in FIG. 7. Splice bar 34 has threaded openings 34a therein which have their centers spaced apart the same distance as the center-to-center distance between the openings 28e of connectors 28. Bolts 26 penetrate clearance openings near the abutting ends of the bars 30 and take down into openings 34a in splice bar 34. At its right-hand end the last mentioned connector bar 30 is supported and secured by a bolt 26 to a connector 28 which is secured on bus bar A3 in trough 16.

Referring to FIGS. 1 and 3, they show main supply voltage bus B connected by Z-offset bars 36 and 38 to bus bars B4 and B1 in troughs 18 and 12, respectively. The connector bars 36 and 38 are of different lengths than Z-offset connector buses 22 and 24, but bar 36 has the same degree of off-set as bar 24, and bar 38 the same degree of off-set as bar 22. Bars 36 and 38 are secured to bus bar B in the same manner as aforedescribed. Bar 36 is bolted at a point intermediate its ends to a connector 28 mounted on bus bar B4, and bus bar 38 is secured adjacent its right-hand end to a connector 28 mounted on bus bar B1. Adjacent its left-hand end connector 36 is supported by a support 32 fastened to bus bar A4. Extensions of connector 38 to bus B2 is provided by a straight connector bar 30 which abuts the right-hand end of bar 38 and is secured therewith to the connector 28 mounted on bus bar B1. The right-hand end of the last mentioned connector bar is secured to a connector 28 mounted on bus bar B2 together with the left-hand end of another straight bus bar 30 which adjacent its right-hand end is supported on the leg of support 32.

FIGS. 1 and 4 show the cross connections between neutral bus bar N in housing 10 and the neutral bus bars in each of the meter troughers. Bus bar N is connected through Z-offset connector bars 40, 42 and 44 to supports 28 mounted on the bus bars N4 and N1 in troughs 18 and 12, respectively. Connections between neutral bus bars N1, N2 and N3 are provided by straight connector bars 30 connected to stand-off connectors 28 supported on each of such neutral bus bars.

Z-offset connector bar 40 at its right-hand is bent at a right angle and the short depending portion is provided with a bolt clearance opening for a bolt 48 which extends therethrough and takes down into a threaded opening in bus bar N. Adjacent its left-hand end bar 40 is provided with a threaded opening alined with elongated openings in each of the Z-offset connector bars 42 and 44. At bolt 26 extending through the openings in bars 42 and 44 take down into the threaded opening in bar 40. Thus the right-hand and left-hand ends of bars 42 and 44 are provided electrical and mechanical connection with the cantilever mounted connector bar 40 over voltage bus bar B with adequate electrical clearance.

FIGS. 1 and 5 show the cross connectors between main supply voltage bus bar C in housing 10 and bus bars C2 and C3 in troughs 14 and 16, and the provision of connection extension from bus bar C into trough 12 without electrical connection to any bus therein. A Z-offset connector bar 22, the same as that shown in FIG. 2, is connected near its left-hand end to bus bar C and its right-hand end midway between the legs of a support 32 secured to bus bar B1 in trough 12. A splice bar 34 connects the last mentioned connector bar 22 to the left end of a straight connector bar 30 which extends to a point between a support 32 secured on bus bar B2 in trough 14. The latter connector bar is attached by a splice bar 34 to another straight connector bar 30 which is attached against its right-hand end to a connector 28 mounted on bus bar C3 in trough 16. The Z-offset bar 24, which is like that of FIG. 1, is connected adjacent its right-hand end together with bar 22 to bus bar C, and is supported adjacent its left-hand end by a leg of a support 32 mounted on bus bar B4 in trough 18.

It will be apparent from the cross connections hereinbefore described, the sequence of single phase voltages in troughs 12, 14 and 16 is A1–B1, C2–B2 and A3–C3. This affords substantial balance of the loads on the three phases of the main supply source. Also, it will be appreciated that other meter troughs can be added to the right of trough 16, and to the left of trough 18. By removal of knockouts in the side walls of troughs 16 and 18 and the adjacent wall of the added troughs it is a simple matter by then adding connector bars 30, connectors 28, supports 32, splice bars 34 and bolts 26 to extend the cross connections to the bus bars of such added troughs.

It will be noted that the Z-offset bus bars 22, 24, and 36 and 38, are provided with bolt clearance openings 22a, 24a, 36a and 38a spaced the same distance from corresponding ends thereof. Similarly, connector bars 30 are provided with openings 30a spaced intermediately between the ends thereof. It will be apparent that these openings are located in such a relation to buses in the troughs 12, 14, 16 and 18 that the voltage phase sequence of the buses in troughs 12, 14 and 16 need not be made as shown. For example, suppose it is desired in trough 12 to have a phase voltage A1–C1 instead of A1–B1. In that case a support 32 would be fastened to bus bar B1 in place of the connector 28 to support Z-offset bar 38 and provide connection with connector bar 30 to the right thereof. Also, the support 32 supporting the connector bar 22 and splice bar 34 connecting bar 22 to connector bar 30 would be reversed and a connector 28 mounted on the assumed C1 bar and bars 22 and 30 secured thereto.

It will be apparent that by a similar rearrangement a phase sequence C1–B2 could also be had in trough 14. Similarly, the same would hold true for troughs 16 and 18 and if desired, a balanced sequence of phases between contiguous troughs need not be maintained insofar as the present invention is concerned. However, the design of the aforedescribed connector bars, supports stand-off connectors, etc., is such as to facilitate maintenance of balanced phase sequencing when adding on additional meter troughs.

As depicted, it may be assumed that the connector bars 30 are of such a length and the various Z-offset connector bars given a mounting with respect to main voltage bus bars A, B and C that they are intended for use with a standard 8½ inch width meter trough. Another widely used size of meter trough is of 10 inch width, and the Z-offset bars 20, 24, 36, 38, 42 and 44 can be used with such wider troughs without alteration. Each of the connector bars 30 would have to be 1½ inches longer overall to provide the connections between meter troughs of a wider kind. As will be seen, the last mentioned Z-offset bars can be accommodated to the wider meter troughs by pulling them right and left on the shanks of the bolts 26 mounting them on the main supply buses A, B and C; the aforementioned elongated openings being of a length affording a total range of adjustment of ¾ of an inch.

From the foregoing it will be seen that the present invention affords cross connections from main three-phase supply buses to parallel single voltage branch buses in any desired phase arrangement or sequence. It can also be seen that the number of kinds and sizes of parts required has been reduced to a minimum, thus affording a saving in manufacturing and field erection costs.

I claim:
1. For effecting cross connections between a plurality of sets of parallel electrical buses which are spaced apart at uniform intervals, in combination, a plurality of U-shaped electrical connectors, each having outwardly depending end portions adjacent the ends of its legs with bolt receiving openings formed therein, said connectors each further having lateral wing portions on both sides of the bight thereof in which are formed threaded bolt openings, said connectors having their depending end portions bolted to the buses at points at which cross electrical connections thereto are to be made, a plurality of

U-shaped insulating support members, each having a bolt receiving opening formed in its bight and having alined rectangular openings adjacent the ends of its legs, said supports having their bights bolted on bus bars at points at which no cross electrical connections thereto are to be made, a plurality of cross connector bars of uniform length having bolt receiving openings formed adjacent both ends thereof, said bars being bolted in end-to-end relation on said wings of said connector members or alternatively abutting end-to-end between the legs of said support member on which they are supported against their ends in the rectangular openings formed in said support members, and a plurality of splice bars of uniform length in which are formed threaded bolt openings, which overlap the cross connector bars between the legs of said insulated supports and to which the cross connector bars are bolted.

2. For effecting electrical cross connections between a set of parallel three-phase A.C. main supply and neutral buses and a plurality of sets of parallel single phase branch supply and neutral buses spaced apart from the main supply buses at uniform intervals, a plurality of Z-offset connector bars which are connected at corresponding ends to the main supply buses and which extend to points over the branch supply buses at one, or both sides of said main supply buses, U-shaped electrical connectors for mounting on branch bus bars at which electrical connection is to be made, said connectors having outwardly turned leg ends with bolt openings which bear against and are bolted to such bus bars, and said connectors having laterally extending wings on both sides of its bight in which are formed threaded bolt openings, a plurality of U-shaped insulating support members for mounting on branch supply buses at points where no electrical cross connection is desired, said support members having bolt receiving openings in their bights which are bolted to the branch supply bus bar and having alined rectangular slots in the leg ends, some of said Z-offset bars at their other ends being bolted to a wing of a connector member while others are supported adjacent the said other ends in the leg openings in said support member, a plurality of straight cross connector bars of uniform length having bolt receiving openings adjacent their ends, certain of said straight connector bars being bolted at both ends to wings of said connector members, others being so connected at one end while supported in the leg opening of a support member, and still others being supported adjacent both ends in the leg openings of support members, and a plurality of straight splice bars of a length slightly less than the span between the legs of said support members and having threaded bolt openings spaced so that they register with the bolt openings of adjacent connector to which adjacent connector bars are bolted.

3. The combination according to claim 2, wherein said Z-offset connector bars at the ends where they are secured to the main supply buses being provided with an elongated opening whereby the effective span length from main bus bar to branch bus bar sets immediately adjacent thereto can be made one or the other of two definite distances to accommodate two standard spacings between main bus bars and branch bus bars sets immediately adjacent thereto.

4. The combination according to claim 3, together with a plurality of other straight bus bars which are longer than those first mentioned by an amount equal to twice the difference in the two standard spacings aforementioned which are used in place of the first mentioned straight connector bar when the branch-to-branch bus set spacing is equivalently lengthened.

5. The combination according to claim 2, wherein said straight connector bars each have bolt receiving openings intermediate those adjacent the ends so spaced therein that when bolted in end-to-end relation to another connector bar that it will register with a connector member secured to a bus bar of a different set of branch bus bars from that which one end of the connector bar overlies.

6. The combination according to claim 2, wherein said Z-offset bars have bolt receiving openings adjacent their ends for bolting to said main bus bar and wing extension of a connector mounted on a bus of an adjacent branch set or alternatively to be bolted to a splice bar, and wherein said Z-offset bars have bolt openings intermediate those adjacent its ends which will register with the bolt opening of a connector mounted on a bus bar of an adjacent branch set.

No references cited.

LARAMIE E. ASKIN, *Primary Examiner.*